US009997958B2

(12) United States Patent
Draaijer et al.

(10) Patent No.: US 9,997,958 B2
(45) Date of Patent: Jun. 12, 2018

(54) DC POWER DISTRIBUTION SYSTEM

(71) Applicant: PHILIPS LIGHTING HOLDING B.V., Eindhoven (NL)

(72) Inventors: Maurice Herman Johan Draaijer, Ittervoort (NL); Bozena Erdmann, Aachen (DE); Matthias Wendt, Würselen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 14/778,376

(22) PCT Filed: Mar. 11, 2014

(86) PCT No.: PCT/IB2014/059609
§ 371 (c)(1),
(2) Date: Sep. 18, 2015

(87) PCT Pub. No.: WO2014/147512
PCT Pub. Date: Sep. 25, 2014

(65) Prior Publication Data
US 2016/0285309 A1      Sep. 29, 2016

Related U.S. Application Data

(60) Provisional application No. 61/803,544, filed on Mar. 20, 2013.

(51) Int. Cl.
H05B 37/02      (2006.01)
H02J 13/00      (2006.01)
H04B 3/54       (2006.01)

(52) U.S. Cl.
CPC .......... *H02J 13/0003* (2013.01); *H04B 3/548* (2013.01); *H05B 37/0263* (2013.01); *H05B 37/0272* (2013.01); *H04B 2203/547* (2013.01)

(58) Field of Classification Search
CPC ............ H05B 37/0218; H05B 37/0227; H05B 37/0263; H05B 37/0272
(Continued)

(56) References Cited

U.S. PATENT DOCUMENTS 8,129,921 B2 * 3/2012 Schleicher ......... H05B 37/0254
                                          315/291
2005/0029967 A1 * 2/2005 Chen .................. H05B 41/2824
                                          315/291
(Continued)

FOREIGN PATENT DOCUMENTS

DE      202012100843 U1      4/2012
EP         1555860 A1        7/2005
(Continued)

*Primary Examiner* — Tung X Le
(74) *Attorney, Agent, or Firm* — Meenakshy Chakravorty

(57) ABSTRACT

The invention relates to a DC power distribution system (1), especially to an EMerge DC power distribution system, for distributing DC power. A power supply (5) supplies DC power to a track (2) to which an electrical load (9, 10) is attached. A communication device (11) is attached to the track (2), which a) wirelessly receives communication signals and transmits the received communication signals via a power line communication provided by the track to the power supply (5) and/or the electrical load (9,), and/or b) receives communication signals via the power line communication from the power supply (5) and/or the electrical load (9, 10) and wirelessly transmits the received communication signals. Thus, a communication setting is provided, which allows for a very simple integration of a control functionality for controlling, for instance, the power supply 10 and/or the electrical load by transmitting control signals via the communication device.

17 Claims, 3 Drawing Sheets

(58) Field of Classification Search
USPC .......................... 315/149, 152, 155, 291, 312
See application file for complete search history.

(56) References Cited

U.S. PATENT DOCUMENTS

| | | | |
|---|---|---|---|
| 2006/0125426 A1* | 6/2006 | Veskovic | H05B 37/0254 315/312 |
| 2006/0202851 A1 | 9/2006 | Cash et al. | |
| 2008/0092075 A1* | 4/2008 | Jacob | H05B 37/0254 715/771 |
| 2010/0237695 A1 | 9/2010 | Covaro et al. | |
| 2010/0283627 A1 | 11/2010 | Ueno | |
| 2011/0197945 A1 | 8/2011 | Schaacke | |

FOREIGN PATENT DOCUMENTS

| | | | |
|---|---|---|---|
| WO | 2004046477 | A2 | 6/2004 |
| WO | 2011136591 | A2 | 11/2011 |
| WO | 2013024460 | A2 | 2/2013 |
| WO | 2013038339 | A1 | 3/2013 |
| WO | 2014080337 | A2 | 5/2014 |

* cited by examiner

DC POWER DISTRIBUTION SYSTEM

CROSS-REFERENCE TO PRIOR APPLICATIONS

This application is the U.S. National Phase application under 35 U.S.C. § 371 of International Application No. PCT/IB2014/059609, filed on Mar. 11, 2014, which claims the benefit of U.S. Provisional Patent Application No. 61/803,544, filed on Mar. 20, 2013, These applications are hereby incorporated by reference herein.

FIELD OF THE INVENTION

The invention relates to a DC power distribution system for distributing DC power. The invention relates further to a communication device, a communication method and a communication computer program for being used with the DC power distribution system.

BACKGROUND OF THE INVENTION

Version 1.1 of the EMerge standard defines a DC power distribution system for distributing DC power, which is provided by a DC power supply, via a track to one or several electrical loads attached to the track. The DC power distribution system does not provide control functionality for controlling, for instance, the DC power supply or the one or several electrical loads. Thus, since according to the EMerge standard the DC power is always on the track, the one or several electrical loads attached to the track are always on, unless they are, for example, manually switched off.

SUMMARY OF THE INVENTION

It is an object of the present invention to provide a DC power distribution system for distributing DC power, which is adapted such that control functionality can be integrated in the DC power distribution system relatively easily.

In a first aspect of the present invention a DC power distribution system for distributing DC power is presented, wherein the system comprises:

a track for distributing DC power, wherein the track is adapted to provide a power line communication, a power supply for supplying DC power to the track, an electrical load attached to the track for receiving DC power, and a communication device attached to the track, wherein the communication device is adapted to a) wirelessly receive communication signals and transmit the received communication signals via the power line communication to the power supply and/or the electrical load, and/or b) receive communication signals via the power line communication from the power supply and/or the electrical load and wirelessly transmit the received communication signals.

Since the communication device attached to the track is adapted to a) wirelessly receive communication signals and transmit the received communication signal via the power line communication to the power supply and/or the electrical load, and/or b) receive communication signals via the power line communication from the power supply and/or the electrical load and wirelessly transmit the received communication signals, a communication setting is provided, which allows for a very simple integration of a control functionality for controlling, for instance, the power supply and/or the electrical load by transmitting control signals via the communication device.

The track is preferentially a bus bar component in accordance with the EMerge standard and the power supply is preferentially a power supply module also in accordance with the EMerge standard. The power supply is preferentially adapted to receive AC power and to convert the received AC power to the DC power. The AC power may be received from a mains supply. The electrical load, which may be a peripheral in accordance with the EMerge standard, is preferentially a luminaire. However, the electrical load can also be another electrical consumer like a sensor, a heating, ventilation and/or air conditioning unit, et cetera.

In a preferred embodiment, the DC power distribution system further comprises a control unit for controlling the power supply and/or the electrical load, wherein the control unit is adapted to wirelessly send control signals as the communication signals to the communication device, wherein the communication device is adapted to transmit the communication signals to the power supply and/or the electrical load via the power line communication for controlling the power supply and/or the electrical load.

The DC power distribution system can comprise one or several tracks, wherein, if the DC power distribution system comprises several tracks mounted at a ceiling of a room, the tracks can form a ceiling grid. The control unit is preferentially not attached to the ceiling, but to, for instance, to a wall of a room such that the power supply and/or the electrical load can be controlled by using the control unit attached to the wall. The control unit can also be a handheld unit like a mobile phone, which is adapted to send the control signals to the communication device.

It is preferred that the DC power distribution system comprises at least two tracks for distributing DC power, which are adapted to provide a power line communication, wherein to each of these at least two tracks a communication device is attached, wherein the communication devices are adapted to wirelessly transmit communication signals between the tracks and transmit the communication signals via the power line communication provided by the respective track. Thus, units attached to different tracks of the DC power distribution system, for instance, electrical loads and/or power supplies attached to different tracks of the DC power distribution system, can communicate with each other via the communication devices, thereby improving the communication functionality of the DC power distribution system.

The communication device may be separate from the power supply and the electrical load. This allows modifying an existing DC power distribution system by separately attaching the communication device to the track, without necessarily needing to modify the track, the power supply and/or the electrical load, such that the DC power distribution system can be provided with the improved communication functionality.

The communication device is preferentially adapted to be clamped on the track. Thus, the communication device can be regarded as being a clamp injection, which can be easily connected to the track by just clamping it and which injects the wirelessly received communication signal into the power line communication provided by the track.

In a preferred embodiment the DC power distribution system is adapted to be integrated with a suspended ceiling, wherein the track comprises a protrusion for holding a ceiling tile of the suspended ceiling and wherein the outer shape of communication device is adapted such that the communication device does not hinder a placing on or removing from the protrusion, if the communication device is attached to the track.

The communication device can be adapted such that its width decreases with decreasing distance to the protrusions of the carrier element in a plane being perpendicular to a length direction of the track. For instance, the communication device can have at least in part a substantially conical cross section and/or in a cross section opposing sides of the communication device may be curved, especially may have the shape of a partial circle. This outer shape of the communication device can provide more space at the sides of the track, to which the communication device is attached, which can allow a user to remove or place the ceiling tile from the protrusion, without being hindered by a part of the outer shape of the communication device. This can facilitate the installation of the suspended ceiling with the integrated DC power distribution system.

The communication device may be integrated in the power supply or the electrical load. Thus, the communication device may be indirectly attached to the track by attaching the respective power supply or electrical load with the integrated communication device to the track. It may therefore not be necessary to install an additional device being the communication device, i.e. it may just be sufficient to install the power supply and the electrical load, which can lead to a further facilitated installing of the DC power distribution system.

The DC power distribution system can comprise one or several communication devices. If the DC power distribution system comprises several communication devices, communication devices can be integrated in the power supply and in the electrical load. Moreover, the DC power distribution system can comprise at least one communication device integrated in the power supply and/or the electrical load and at least one further separate communication device directly attached to the track.

The communication device may be adapted only to a) wirelessly receive communication signals and transmit the received communication signals via the power line communication and/or b) receive communication signals via the power line communication and wirelessly transmit the received communication signals. That means the communication device may just be adapted to forward received communication signals, without having any intelligence. Thus, the communication device can be a technically relatively simple device, which is not error prone and which can be manufactured easily.

However, in another embodiment the communication device may comprise forwarding rules defining which kind of communication signals should be forwarded to which of the power supply and the electrical load, wherein the communication device can be adapted to a) wirelessly receive communication signals and transmit the received communication signals via the power line communication and/or b) receive communication signals via the power line communication and wirelessly transmit the received communication signals in accordance with the forwarding rules. Thus, the communication device can comprise an electrical circuit for controlling the forwarding operations depending on the forwarding rules.

The communication device may be adapted to be powered by the DC power distributed via the track. Thus, the communication device may not necessarily be provided with an own power source like a battery. However, the communication device may also comprise a power storage device for powering the communication device. The power storage device is, for instance, a battery or an electric double-layer capacitor also named supercapacitor. In an embodiment the power storage device is rechargeable, wherein the DC power provided via the track can be used for recharging the power storage device.

The communication device may be switchable and, thus, controllable, wherein it may be switchable depending on a switching signal received wirelessly or via the power line communication from another device like the control unit. The communication device may also comprise a circuit for automatically switching itself on or off depending on received communication signals.

In a further aspect of the present invention a communication device for a DC power distribution system as defined in claim 1 is presented, wherein the communication device is adapted to a) wirelessly receive communication signals and transmit the received communication signals via the power line communication provided by a track of the DC power distribution system to a power supply and/or an electrical load of the DC power distribution system, and/or b) receive communication signals via the power line communication from the power supply and/or the electrical load and wirelessly transmit the received communication signals.

In a further aspect of the present invention a communication method for being used with a DC power distribution system as defined in claim 1 is presented, wherein the communication method comprises:

wirelessly receiving communication signals and transmitting the received communication signals via the power line communication provided by a track of the DC power distribution system to a power supply and/or an electrical load of the DC power distribution system, and/or receiving communication signals via the power line communication from the power supply and/or the electrical load and wirelessly transmitting the received communication signals.

In a further aspect of the present invention a communication computer program for being used with a DC power distribution system as defined in claim 1 is presented, wherein the communication computer program comprises program code means for causing a communication device as defined in claim 13 to carry out the steps of the communication method as defined in claim 14, when the communication computer program is run on a computer controlling the communication device.

It shall be understood that the DC power distribution system of claim 1, the communication device of claim 13, the communication method of claim 14, and the communication computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
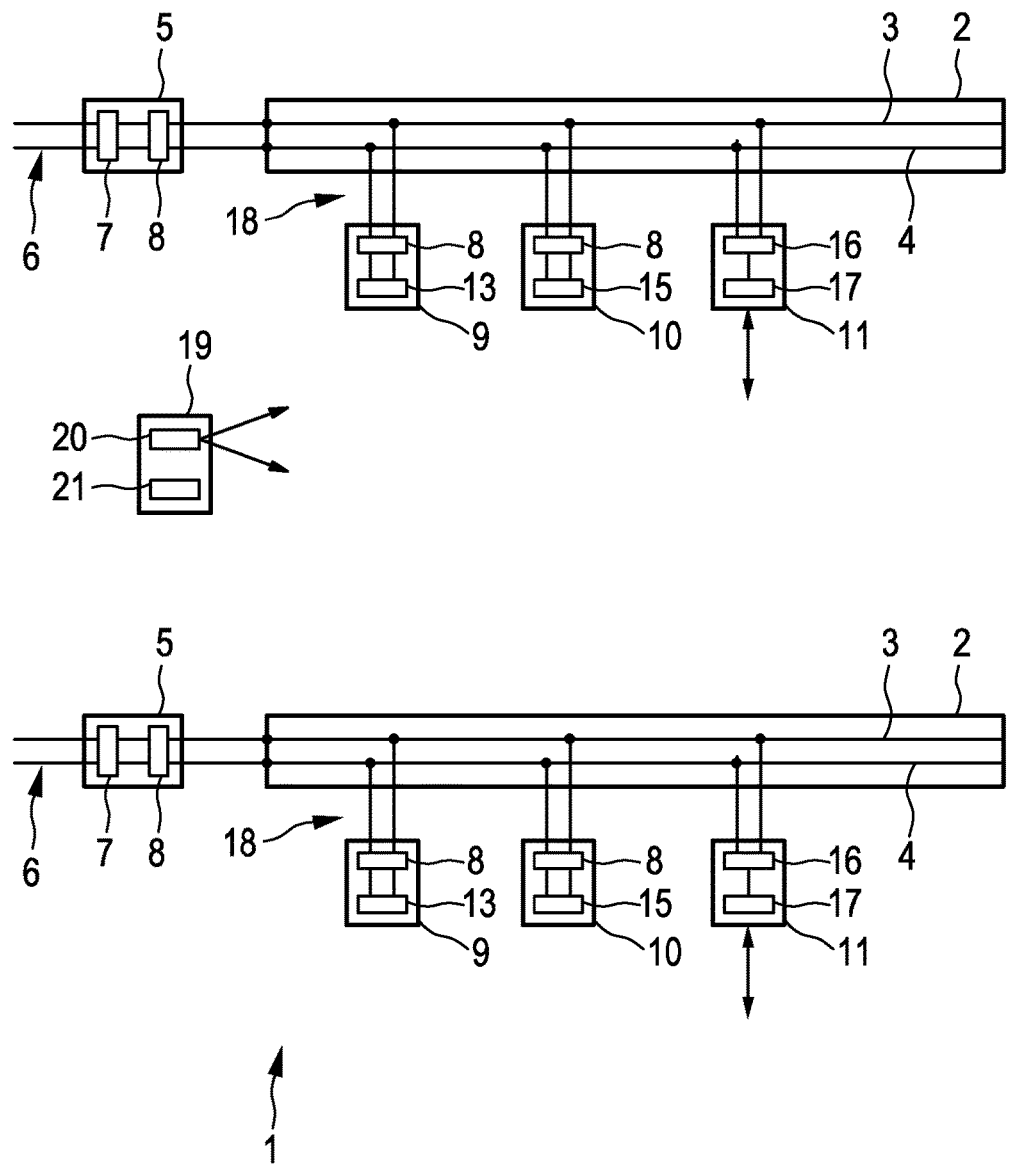
FIG. 1 shows schematically and exemplarily an embodiment of a DC power distribution system.

FIG. 1 shows schematically and exemplarily an embodiment of a DC power distribution system for distributing DC power. The DC power distribution system 1 comprises several tracks 2 for distributing DC power, wherein the tracks 2 are adapted to provide a power line communication. The tracks 2 are preferentially bus bar components in accordance with the EMerge standard. The DC power distribution system 1 further comprises power supplies 5 for supplying DC power to the tracks 2 and electrical loads 9, 10 attached to the tracks 2 for receiving the DC power. Also communication devices 11 are attached to the tracks 2, wherein the communication devices 11 are adapted to a) wirelessly receive communication signals and transmit the received communication signals via the power line communication to the power supplies 5 and/or the electrical loads 9, 10, and/or b) receive communication signals via the power line communication from the power supplies 5 and/or the electrical loads 9, 10 and wirelessly transmit the received communication signals.

The DC power distribution system 1 further comprises a control unit 19 for controlling the power supplies 5 and/or the electrical loads 9, 10, wherein the control unit 19 is adapted to wirelessly send control signals as the communication signals to the communication devices 11, wherein the communication devices 11 are adapted to transmit the communication signals to the power supplies 5 and/or the electrical loads 9, 10 via the respective power line communication for controlling the power supplies 5 and/or the electrical loads 9, 10. The DC power distribution system 1, particularly the communication devices 11, provides therefore a hybrid power line-wireless control solution. The control unit 19 can be adapted to be a switch for switching the power supplies 5 and/or the electrical loads 9, 10.

In this embodiment the DC power distribution system 1 comprises at least two tracks 2 for distributing DC power, which are adapted to provide a power line communication, wherein to each of these at least two tracks 2 a communication device 11 is attached. These communication devices 11 are adapted to wirelessly transmit communication signals between the tracks 2 and to transmit the communication signals via the power line communication provided by the respective track 2.

The communication devices 11 are separate elements, i.e. in this embodiment they are not integrated in the power supplies 5 or the electrical loads 9, 10. Moreover, the communication devices 11 are adapted to be clamped on the tracks 2 as exemplarily and schematically shown in FIG. 2.

Figure 2:
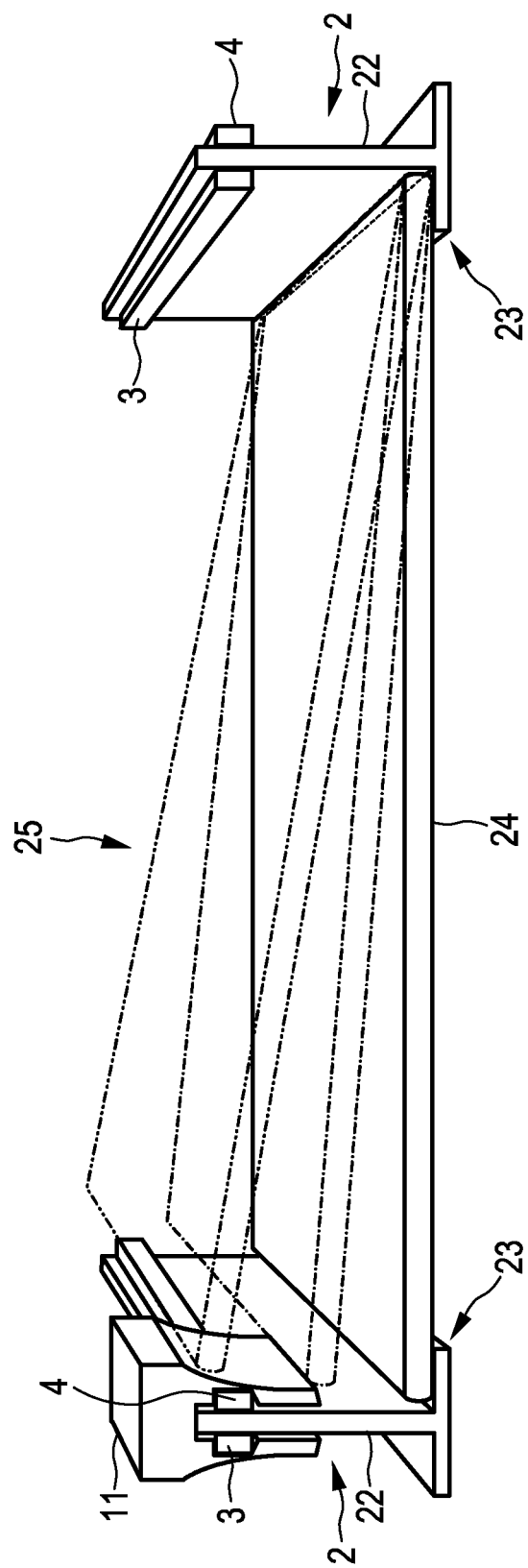
FIG. 2 illustrates the outer shape of a communication device of the DC power distribution system shown in FIG. 1.

As can be seen in FIG. 2, the DC power distribution system 1 is preferentially integrated with a suspended ceiling, wherein the suspended ceiling comprises ceiling tiles 24 arranged on protrusions 23 of carrier elements 22 of the tracks 2. The tracks 2 comprise electrical conductors 3, 4, which may also be regarded as being bus bar conductors, for distributing the DC power provided by the power supplies 5. These electrical conductors 3, 4 are also used for the power line communication. The communication device 11 is clamped on the upper part of the respective track 2, thereby enclosing the electrical conductors 3, 4. The communication device 11 has a curved outer shape, i.e. curved outer sidewalls, which are curved such that in use the width of the communication device 11 in a plane being perpendicular to the electrical conductors 3, 4 decreases with decreasing distance to the protrusions 23 of the carrier element 22. This allows placing and removing the ceiling tile 24, without being hindered by the communication device 11 as indicated in FIG. 2 by the different positions 25 of the ceiling tile.

The power supplies 5 comprise a converter 7 for converting AC mains power received via electrical conductors 6 from a mains supply to the DC power to be provided to the electrical conductors 3, 4 of the tracks 2. The power supplies 5 further comprise communication signal transceivers 8 for receiving and sending communication signals, wherein the communication signal transceivers 8 are further configured to modulate and demodulate signals, in order to transform power line communication commands into commands, which are executable by the power supplies 5, and for generating power line communication commands to be sent via the power line communication.

The electrical loads 9 are luminaires having communication signal transceivers 8 and light sources 13. The light sources 13 preferentially comprise a driver circuit for controlling the characteristics of the light like the light intensity and/or the light color emitted by the light source 13, wherein the driver circuit can be controlled depending on control signals received and demodulated by the communication signal transceiver 8. The electrical loads 9 are electrically connected to the electrical conductors 3, 4 via electrical connections 18. Also the electrical loads 10 and the communication devices 11 are electrically connected to the electrical conductors 3, 4 via the electrical connections 18.

The electrical loads 10 also comprise communication signal transceivers 8. Moreover, in this embodiment the electrical loads 10 comprise an air conditioning means 15 controllable by control signals received and demodulated by the communication signal transceivers 8.

The control unit 19 is attached to a wall of a room, in which the DC power distribution system 1 is installed at the ceiling. The control unit 19 comprises an input unit 21 for allowing a user to input control information for controlling the electrical loads 9, 10 and/or the power supplies 5. The input unit 19 can be, for instance, a key pad, a rotatable knob, a touch screen, et cetera. The control unit 19 further comprises a sending unit 20 for converting the input control information into control signals and for wirelessly sending the control signals to the communication devices 11. The communication devices 11 comprise sending and receiving units 17 for receiving the control signals from the control unit 19 and signal converters 16 for converting the received wireless signals to power line communication signals and for transmitting the converted power line communication signals via the electrical conductors 3, 4 of the tracks 2. In this way the power supplies 5 and/or the electrical loads 9, 10 can be controlled by the control unit 19 via the communication devices 11.

The signal converters 16 are also adapted to convert power line communication signals received from the electrical conductors 3, 4 of the tracks 2 into wireless signals, which can then be sent by the sending and receiving units 17 to other communication devices 11 and/or to the control unit 19. In the latter case the sending unit 20 of the control unit 19 is also adapted to receive wireless signals. For instance, the received wireless signals may be indicative of information about an actual or a previous status of the luminaires and/or the air conditioning devices, wherein the control unit can comprise an output unit like a display for showing this information, or the control unit can forward this information to a further device like a room management system or like a separate output device for outputting this information. If in another embodiment at least one of the electrical loads attached to a track is a sensing device like a presence sensor for detecting the presence of a person in a room, the control unit may be adapted to receive corresponding wireless sensing signals and to send in response control signals to the luminaires for controlling the luminaires depending on the received presence signal. For example, if the received presence signal indicates that a person is present in a room, the control unit can send control signals to the luminaires, in order to increase the light intensity provided by the luminaires, in particular, in order to switch the luminaires on. If in a further embodiment the DC power distribution system comprises a light flux sensor for measuring the light flux in a room, for instance, near a window of a room, the control unit can be adapted to receive light flux signals being indicative of the light flux measured in the room and to send control signals to the luminaires depending on the light flux indicated by the received light flux signals. In this way the luminaires can be controlled such that the light intensity provided by the luminaires is increased, if the measured light flux decreases.

Thus, in this embodiment the communication devices 11 are just adapted to a) wirelessly receive communication signals and transmit the received communication signals via the respective power line communication and/or b) receive communication signals via the respective power line communication and wirelessly transmit the received communication signals. The communication devices 11 may therefore just be adapted to forward received communication signals, without requiring an intelligent circuit.

The communication devices 11 are adapted to be powered by the DC power distributed via the tracks 2. However, the communication devices may also comprise a power storage device like a battery or a supercapacitor for powering the communication devices. Moreover, the communication devices may be switchable. For instance, they may receive switching signals from, for example, the control unit 19 such that the communication devices 11 may be switched on or off by using the control unit 19.

Figure 3:
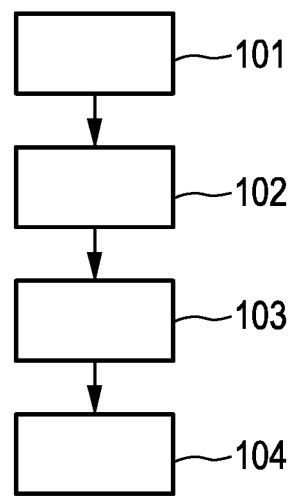
FIG. 3 shows a flowchart exemplarily illustrating a communication method for being used with the DC power distribution system shown in FIG. 1.

In the following an embodiment of a communication method for being used with the DC power distribution system 1 will exemplarily be described with reference to a flowchart shown in FIG. 3.

In step 101 the control unit 19 wirelessly sends control signals to the communication devices 11. In step 102 the communication devices 11 receive the control signals and convert the wirelessly received control signals into power line communication control signals. In step 103 the converted power line communication control signals are transmitted to the power supplies 5 and/or electrical loads 9, 10 via the power line communications provided by the tracks 2, and in step 104 the power supplies 5 and/or the electrical loads 9, 10 are controlled depending on the transmitted power line communication control signals.

The power line communication has the advantage of being a very robust communication as opposed to the generally more crowded wireless spectrum. Moreover, power line communication can allow for a natural and automatic device grouping according to their respective physical location and generally also according to their respective powering, if the one or several tracks connected to a power supply have a separate power line communication channel. For instance, in FIG. 2 the electrical loads 9, 10 attached to the same track 2 may automatically form a device group.

The power line communication, i.e. the respective power line communication interface, may use known power line communication techniques, for instance, high bandwidth technology like a HomePlug based technology or known low bandwidth technologies. The power line communication may use serial or shared medium protocols and may use a master/slave configuration or not. Furthermore, the power line communication of different tracks may be separated, i.e. each track may have its own power line communication channel, or several tracks may be connected such that they use the same power line communication channel. For instance, if several tracks are connected to the same power supply, these tracks may have a common power line communication channel.

The used wireless communication, i.e. the used wireless communication interface, can be based on any known wireless technique, i.e. any radiotechnology, a wireless low bandwidth technology, a wireless high bandwidth technology, a wireless technology in accordance with a standard or a proprietary wireless technology, a wireless technology using a mesh topology or another topology, et cetera. For example, the wireless communication can use Wi-Fi, ZigBee, BT, 6LoWPAN, et cetera. Also other forms of wireless communication can be used like a technique based on audio transmitting/receiving or light emitting/detecting.

The wireless technology is especially useful in cases in which devices, which should communicate with devices attached to the track, are located off the ceiling grid. In particular, the wireless technology is especially useful if a control unit like a wall switch, which has been described above with reference to FIG. 1, a wall or table top remote control, handheld devices like smartphones and tablets adapted to control the devices attached to the track, et cetera are used for sending control signals to the devices attached to the track. The control device like the control unit 19 described above with reference to FIG. 1, in particular, the sending unit 20, preferentially comprises an antenna for wirelessly sending and optionally also receiving communication signals. Also the sending and receiving units 17 of the communication devices comprise an antenna for wirelessly sending and receiving the communication signals.

In the DC power distribution system described above with reference to FIG. 1 the communication does not stop at a certain track. Between the tracks a track-to-track communication is provided by using the communication devices 11, which may also be regarded as being injection clamps. This enables, for instance, a communication between fixtures, i.e. electrical loads, attached to different tracks. The hybrid wireless-power line communication enables also a communication between the electrical loads on the ceiling grid, i.e. attached to the tracks, and devices, which are not attached to the ceiling grid like a wall switch. In order to provide this communication, the communication devices contain both communication interfaces, the power line interface and the wireless interface. They are preferentially just able to forward messages, in particular, selected messages, received over one interface to the other interface, in order to connected disjoint communication channels and to create one hybrid control system. Fixtures like the electrical loads 9, 10 and/or the power supplies and/or other electrical loads on the ceiling grid like, for instance, access points may also be adapted to provide this hybrid control functionality, wherein in this case the communication devices may be integrated in these devices on the ceiling grid.

The communication devices can be relatively simple devices, which may forward any communication received on the wireless interface or the power line communication interface, wherein they may be a unidirectional or bidirectional forwarder. However, the communication devices can also comprise a circuit for forwarding the traffic, i.e. the communication signals, to selected devices only and/or to selected other communication devices only, which may also be regarded as being bridges. The communication devices may also be adapted to send certain communication signals, which have been received via one of the interfaces, via the same interface, with or without forwarding the received communication signal via the other interface. In general, the communication devices may comprise forwarding rules defining which kind of communication signals should be forwarded to which devices, in particular, to which power supply or to which electrical load, over which communication interface. For instance, the communication devices can be adapted to a) wirelessly receive communication signals and transmit the received communication signals via the power line communication and/or b) receive communication signals via the power line communication and wirelessly transmit the received communication signals in accordance with the forwarding rules.

The bridging functionality, i.e. the bridging between the power line communication interface and the wireless interface, may be controllable, i.e. the communication devices may be switchable such that the wireless communication interface and/or the power line communication interface may be switched off and on. This switching may be performed automatically, for instance, by a self-detection procedure at the communication devices, manually by a hardware means or via the power line or wireless communication, wherein in the latter case a switching signal may be sent to the communication devices by using the control unit or another device. The communication devices may be switched during configuration/commissioning of the DC power distribution system, during operation of the DC power distribution system, et cetera. Moreover, the communication devices may be automatically switched depending on the installation status, the amount of information or track error conditions. In an embodiment an electrical load attached to a track is adapted to send a power line communication signal to a communication device, in order to switch the communication device on, if the electrical load requires the communication functionality.

The forwarding rules, which can be regarded as defining forwarding and filtering options, may be pre-configured or may be configurable at commissioning and/or at runtime. For instance, the forwarding rules can be configurable by electrical loads attached to the tracks, wherein the electrical loads can be adapted to request certain communication functionality from the communication device. For example, an electrical load can be adapted to request from the communication device to forward power line communication signals from the electrical load only to certain other devices or to receive from the communication device only certain kinds of signals or to receive only signals from certain devices. Moreover, the communication device can be adapted to have a list of devices, which are in power line communication with the communication device, wherein the forwarding rules can define that wirelessly received signals should only be forwarded via the power line communication channel, if they are addressed to a device of the list. The list may be pre-configured, in particular, manually pre-configured by an installer, and/or it may be creatable or modifiable by the communication device, wherein attached electrical loads and/or power supplies can be adapted to send a power line communication identification signal to the communication device, in order to allow the communication device to add the attached electrical loads and/or power supplies to the list.

The communication devices, which can also be regarded as being injection clamps, are easily attachable to the tracks, i.e. in this embodiment to the EMerge bars, and have a form factor that still enables a simple placing and removing of ceiling tiles. The form factor of the communication devices is adapted such that the communication devices do not hinder the movement of ceiling tiles when being placed on or removed from a protrusion of a carrier element of the tracks. The control functionality can be easily installed by clicking the communication devices on the tracks, which may provide a vendor independent solution for data communication. The installation of the communication functionality is relatively simple and can be done, after the other components of the DC power distribution system have been installed already. The communication devices allow for a retrofit solution enabling a provision of the communication functionality to existing DC power distribution systems. The communication functionality can provide a control network for controlling individual devices, in particular, electrical loads, or groups of devices.

Although in above described embodiments mainly control signals are transmitted via the communication device, also other signals, which are not control signals, can be transmitted via the communication device. For instance, signals being indicative of information about, for instance, a status of a device or other signals may be transmitted via the communication device.

Although in the embodiment described above with reference to FIG. 1 the communication devices are separate from other devices like the electrical loads attached to the tracks, in other embodiments the communication devices can also be integrated in a power supply and/or in an electrical load.

Although in the embodiment described above with reference to FIG. 1 each track is connected to an individual power supply, in another embodiment several tracks can be electrically connected to the same power supply. For instance, in FIG. 1 only a single power supply may be electrically connected to the two tracks.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations like the sending and receiving of wireless signals and/or power line communication signals, the modulation or demodulation of the communication signals, the generation of control signals based on control information, which may be input by a user, et cetera performed by one or several units or devices can be performed by any other number of units or devices. These operations, in particular, the functionality of the hybrid wireless-power line communication device can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a DC power distribution system, especially to an EMerge DC power distribution system, for distributing DC power. A power supply supplies DC power to a track to which an electrical load is attached. A communication device is attached to the track, which a) wirelessly receives communication signals and transmits the received communication signals via a power line communication provided by the track to the power supply and/or the electrical load, and/or b) receives communication signals via the power line communication from the power supply and/or the electrical load and wirelessly transmits the received communication signals. Thus, a communication setting is provided, which allows for a very simple integration of a control functionality for controlling, for instance, the power supply and/or the electrical load by transmitting control signals via the communication device.

The invention claimed is:

1. A power distribution system comprising:
   a track for distributing DC power, wherein the track is adapted to provide a power line communication;
   a power supply for supplying said DC power to the track;
   a luminaire attached to the track for receiving said DC power from the track; and
   a communication device attached to the track, wherein the communication device is adapted to a) wirelessly receive first communication signals and transmit the received first communication signals via the power line communication to the power supply and/or the luminaire, and/or b) receive second communication signals via the power line communication from the power supply and/or the luminaire and wirelessly transmit the received second communication signals.

2. The system as defined in claim 1, wherein the power distribution system further comprises a control unit for controlling the power supply and/or the luminaire, wherein the control unit is adapted to wirelessly send control signals as the first communication signals to the communication device, wherein the communication device is adapted to transmit the first communication signals to the power supply and/or the luminaire via the power line communication for controlling the power supply and/or the luminaire.

3. The system as defined in claim 1, wherein the track is a first track, the DC power is first DC power, the power line communication is a first power line communication, the communication device is a first communication device and the power distribution system comprises at least one other track for distributing second DC power, wherein said at least one other track is adapted to provide a second power line communication, wherein to the at least one other track, at least one other communication device is attached, wherein the first and the at least one other communication devices are adapted to wirelessly transmit said first communication signals, said second communication signals and/or third communication signals between the first track and the at least one other track and transmit the first, second and/or third communication signals via the power line communication provided by the respective track.

4. The system as defined in claim 1, wherein the communication device is separate from the power supply and the luminaire.

5. The system as defined in claim 4, wherein the communication device is adapted to be clamped on the track.

6. The system as defined in claim 1, wherein the communication device is integrated in the power supply or the luminaire.

7. The system as defined in claim 1, wherein the communication device is adapted only to a) wirelessly receive said first communication signals and transmit the received first communication signals via the power line communication and/or b) receive said second communication signals via the power line communication and wirelessly transmit the received second communication signals.

8. The system as defined in claim 1, wherein the communication device comprises forwarding rules defining which communication signal types should be forwarded to which of the power supply and the luminaire, wherein the communication device is adapted to a) wirelessly receive said first communication signals and transmit the received first communication signals via the power line communication in accordance with the forwarding rules and/or b) receive said second communication signals via the power line communication and wirelessly transmit the received second communication signals in accordance with the forwarding rules.

9. The system as defined in claim 1, wherein the communication device is adapted to be powered by the DC power distributed via the track.

10. The system as defined in claim 1, wherein the communication device is switchable.

11. The power distribution system as defined in claim 1, wherein the communication device is configured to a) wirelessly receive the first communication signals and transmit the received first communication signals via the power line communication to the power supply, and/or b) receive the second communication signals via the power line communication from the power supply and/or the luminaire and wirelessly transmit the received second communication signals.

12. The power distribution system as defined in claim 1, wherein the communication device is configured to a) wirelessly receive the first communication signals and transmit the received first communication signals via the power line communication to the power supply, and/or b) receive the second communication signals via the power line communication from the power supply and wirelessly transmit the received second communication signals.

13. The power distribution system as defined in claim 1, wherein the luminaire is primarily powered by said DC power.

14. A communication device for a power distribution system including a track, a power supply and a luminaire, wherein the power supply supplies DC power to the track and the luminaire is attached to the track for receiving said DC power from the track, wherein the communication device is adapted to a) wirelessly receive first communication signals and transmit the received first communication signals via a power line communication, which is provided by the track of the power distribution system, to the power supply and/or the luminaire of the power distribution system, and/or b) receive second communication signals via the power line communication from the power supply and/or the luminaire and wirelessly transmit the received second communication signals.

15. A communication method for being used with a power distribution system including a track, a power supply and a luminaire, wherein the power supply supplies DC power to the track and the luminaire is attached to the track for receiving said DC power from the track, and wherein the communication method comprises:
   wirelessly receiving first communication signals and transmitting the received first communication signals via a power line communication, which is provided by the track of the power distribution system, to the power supply and/or the luminaire of the power distribution system; and/or receiving second communication signals via the power line communication from the power supply and/or the luminaire and wirelessly transmitting the received second communication signals.

16. A computer readable non-transitory storage medium comprising a computer readable program configured to cause a computer to implement the method of claim 15.

17. A power distribution system comprising:
a track for distributing DC power, wherein the track is adapted to provide a power line communication;
a power supply for supplying said DC power to the track;
an electrical load device attached to the track for receiving said DC power from the track; and
a communication device attached to the track, wherein the communication device is adapted to a) wirelessly receive first communication signals and transmit the received first communication signals via the power line communication to the power supply and/or the electrical load device, and/or b) receive second communication signals via the power line communication from the power supply and/or the electrical load device and wirelessly transmit the received second communication signals;
wherein the track is a first track, the DC power is first DC power, the power line communication is a first power line communication, the communication device is a first communication device and the power distribution system comprises at least one other track for distributing second DC power, wherein said at least one other track is adapted to provide a second power line communication, wherein to the at least one other track, at least one other communication device is attached, wherein the first and the at least one other communication devices are adapted to wirelessly transmit said first communication signals, said second communication signals and/or third communication signals between the first track and the at least one other track and transmit the first, second and/or third communication signals via the power line communication provided by the respective track.

* * * * *